United States Patent [19]

Winsche et al.

[11] 3,969,631

[45] July 13, 1976

[54] GAS PRODUCTION APPARATUS

[75] Inventors: Warren E. Winsche; Francis T. Miles, both of Bellport; James R. Powell, Wading River, all of N.Y.

[73] Assignee: The United States of America as represented by the United States Energy Research and Development Administration, Washington, D.C.

[22] Filed: Mar. 20, 1975

[21] Appl. No.: 560,430

[52] U.S. Cl. ............................... 250/527; 176/9
[51] Int. Cl.² ..................... B01K 1/00; B01J 1/10
[58] Field of Search .......... 23/252 R; 250/527; 176/1, 9

[56] References Cited
FOREIGN PATENTS OR APPLICATIONS
2,061,769  6/1971  France ............................. 176/1

OTHER PUBLICATIONS
Power Generation (Apr. 1949) pp. 75, 76, 126–130.

Glasstone et al., "Controlled Thermonuclear Reactions (1960) p. 42.

Primary Examiner—Howard S. Williams
Attorney, Agent, or Firm—Dean E. Carlson; Leonard Belkin; Cornell D. Cornish

[57] ABSTRACT

This invention relates generally to the production of gases, and more particularly to the production of tritium gas in a reliable long operating lifetime systems that employs solid lithium to overcome the heretofore known problems of material compatibility and corrosion, etc., with liquid metals. The solid lithium is irradiated by neutrons inside low activity means containing a positive (+) pressure gas stream for removing and separating the tritium from the solid lithium, and these means are contained in a low activity shell containing a thermal insulator and a neutron moderator.

15 Claims, 3 Drawing Figures

3,969,631

GAS PRODUCTION APPARATUS

STATEMENT OF THE GOVERNMENT'S INTEREST

This invention was made in the course of, or under a contract with the Energy Research and Development Administration, or its predecessor, the U.S. Atomic Energy Commission.

BACKGROUND OF THE INVENTION

In the field of gas production, a need exists for means for producing tritium from lithium with neutrons having energies of 2.45 MeV, 14.1 MeV and 14.7 MeV. However, the methods and apparatus proposed heretofore that have employed liquid lithium as the breeding medium, as described in Princeton Plasma Physics Laboratory Report MATT-1050, have involved difficult problems of material compatibility, corrosion, or the movement of liquid metals in magnetic fields. It has also been advantageous to provide tritium producing apparatus and methods having reliability and long operating times.

SUMMARY OF THE INVENTION

This invention provides a method and apparatus for the production, separation and removal of tritium from a solid. More particularly, this invention provides a tritium breeding blanket module for use with a source of neutrons having energies in the range of between about 2.45 MeV and 14.7 MeV, in which the module contains a solid lithium aluminum target for producing the tritium from the incident neutrons. The means for separating and removing the tritium from the solid lithium aluminum target is provided by gas cooling tubes containing positive (+) pressure gas coolant streams that circulate in the tubes. In one embodiment of the module of this invention, coolant tubes are low activity tubes containing the target and neutron moderator-multiplier means that heats up the center of the module, and the tubes are contained in a low activity shell having a thermal insulator that separates the shell from the hot interior of the module. Advantageously, the lwo neutron induced activity is provided by a suitable aluminum product cooling means interposed between the target and the neutron source, and the gas coolant streams are circulated in the cooling means in contact with the target means to separate and remove the tritium that escapes therefrom by diffusion. With the proper selection of the target, moderator, shell and other components, as described in more detail hereinafter, the desired tritium breeding is achieved.

It is an object of this invention, therefore, to provide a solid lithium breeding blanket module for high energy neutrons.

The above and further novel features and objects will be understood in more detail from the following detailed description of one embodiment, when the same is read in connection with the accompanying drawing.

BRIEF DESCRIPTION OF THE DRAWINGS

In the figures, where like elements are referenced alike.

DESCRIPTION OF THE PREFERRED EMBODIMENT

It is known that gases can be produced by bombarding a target with neutrons. For example, tritium gas can be produced by bombarding a Li target with slow neutrons, as described on page 42 of "Controlled Thermonuclear Reactions," by Glasstone and Lovberg, Van Nostrand, 1960. In this regard, it is well known that fast neutrons can be multiplied and slowed down to the desired energies is blankets containing combined neutron moderators and multipliers, such as Be and Be O, or neutron moderators, such as graphite, and metal hydrides. This invention hereinafter described utilizes a tritium gas production system of this type, in which the lithium target is a solid contained in a low activity containment means having a shell, a thermal insulator, a moderator for slowing down fast neutrons, and gas coolant tubes containing + pressure gas coolant streams for separating and removing the tritium from the solid lithium target. A description of the basis for this invention is provided in Conference Publication 740402-P-1, which is available from the Technical Information Center, Oak Ridge, Tennessee, which is incorporated by reference herein.

Figure 1:
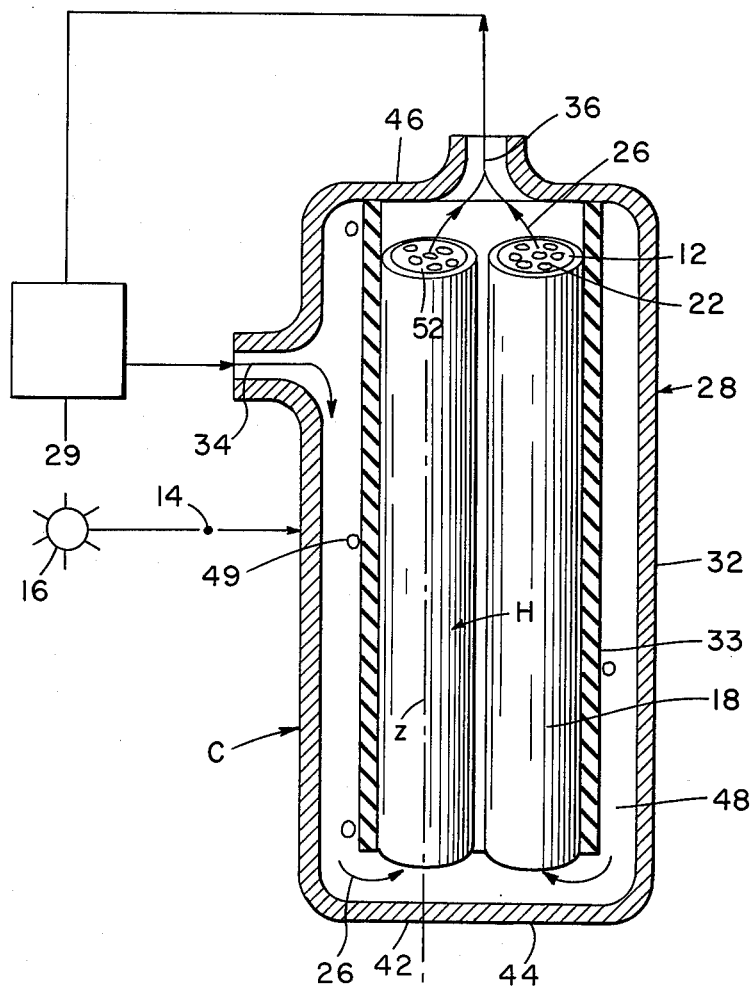
FIG. 1 is a partial cross-section of the preferred embodiment of the module of this invention.
Figure 1A:
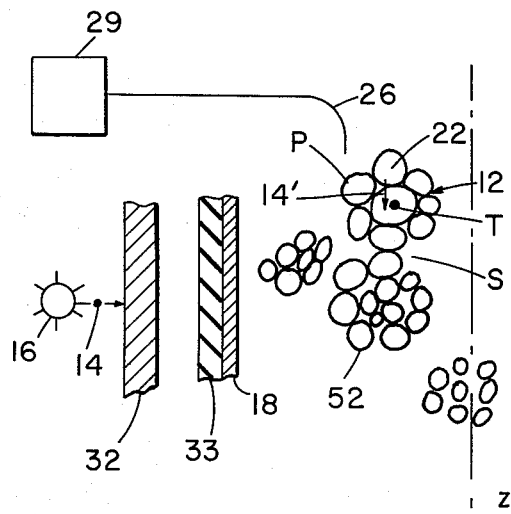
FIG. 1a is a partial cross-section of the particles of this invention.

In order to explain how the method and apparatus of this invention accomplish the function of separating, and removing the tritium from the solid lithium neutron target, reference is made to FIG. 1a, wherein is illustrated the position prior to alteration of a typical atom T of tritium produced by transmutation in a longitudinally extending solid lithium target 12 that is disposed along a Z axis transverse to the path of neutrons 14 from a source 16. Disposed along the length of the solid lithium target are low activity cooling tubes 18 that contain a moderator 22 and that are contained in a module 28 having a low activity cylindrical shell 32 and an insulator 33 between the shell and the cooling tubes 18. Each cooling tube 18 contains a positive pressure gas stream 26, which, as understood in the art, tends to remove the tritium atom that escapes from the solid target 12 by diffusion. Thus, should the module 28 be bombarded with fast neutrons in the range of up to 14.7 MeV, the neutrons will directly or indirectly by moderation and/or multiplication transmutate the lithium target into tritium, which is separated and removed from the target by the gas coolant streams for recovery and reuse by a recovery system 29.

Figure 2:
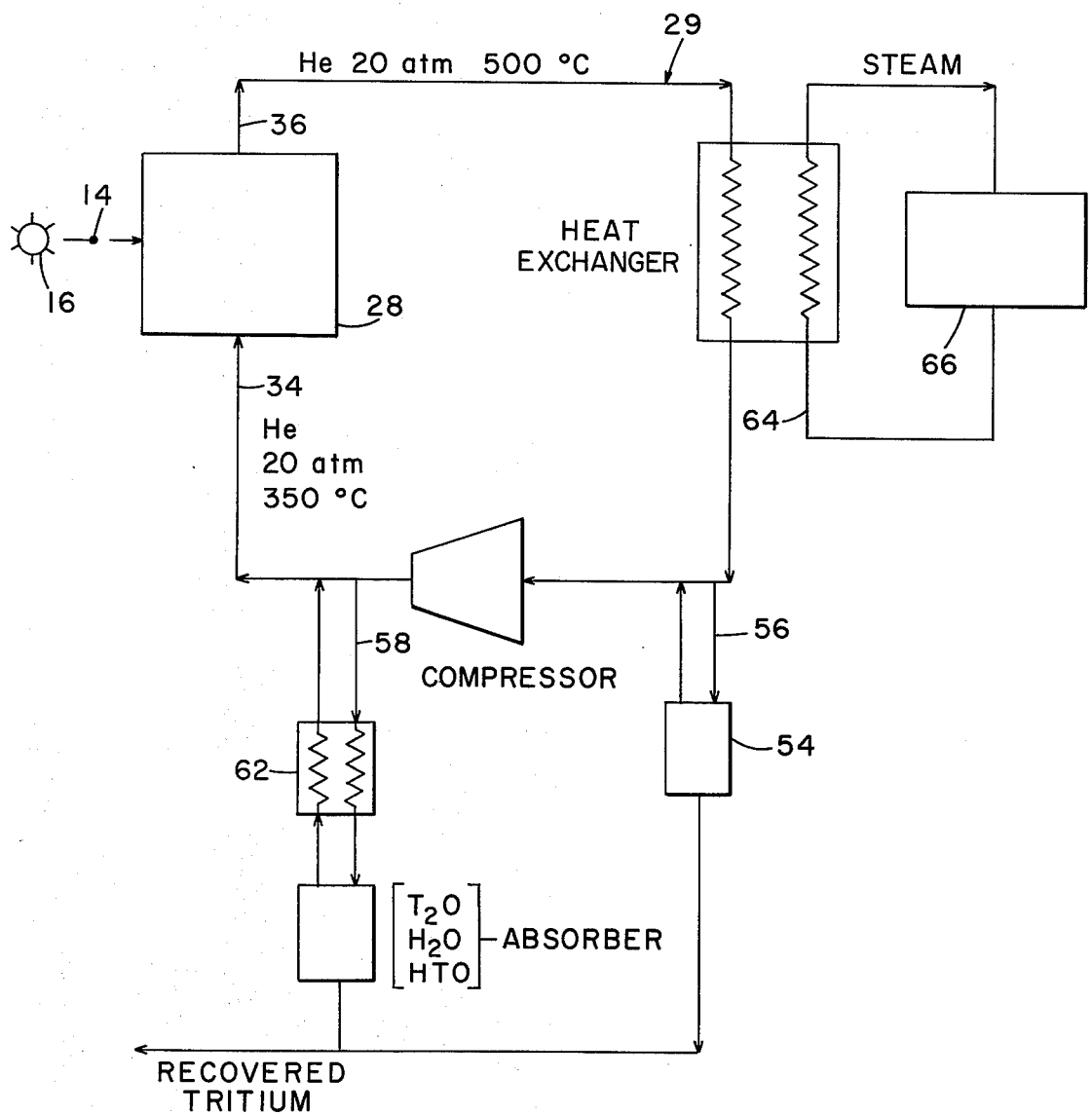
FIG. 2 is a partial schematic view of the tritium removal system of FIG. 1.

A practical arrangement for accomplishing the desired separation and removal is shown in FIGS. 1 and 2, as understood in more detail hereinafter. FIG. 1 is a partial cross-section of one embodiment of the blanket module 28 of this invention, which comprises a shell 32 having an insulator 33, a moderator 22, cooling tubes 18, and a Li target 12. The cylinderical shell 32 is advantageously pure aluminum strengthened by an $Al_2O_3$ dispersoid, referred to in the art as SAP (sintered aluminum product), in which the pure aluminum is strengthened by the addition of 5–10% by weight of $Al_2O_3$ in the form of a very fine dispersoid in the aluminum matrix, or an Al-Mg-Si wrought alloy (6000 series type). A description of SAP is provided in "Heavy Water Organic Cooled Reactor — SAP Handbook — AI — CE — Memo — 24 " (Mar. 23, 1966). This material, which was developed for the organic cooled reactor program, has the advantages of being reasonably strong (~10,000 psi) at 350°–400°C; aluminum and $Al_2O_3$ can be made at least 99.7% pure; the long-lived activation products of Al and O from 14 MeV neutrons are very small; it has good resistance to radiation damage; it has high thermal conductivity; and it is relatively cheap (~$1/lb.). This compares to the other possible structural materials, such as beryllium, which is difficult to fabricate, expensive, an not structurally reliable, graphite and silicon carbide, which are brittle and low strength; and other Al alloys, which are much weaker than SAP at 400°C. Magnesium with a MgO dispersoid could be a possible alternative to SAP.

The commercially available aluminum with the lowest activation curve is the ALCOA brand 1199 grade aluminum. It is normally 99.97% pure, with a typical impurity analysis given in Table I. This grade was not developed for low activation, but it is one of ALCOA's standard grades, at ~ $0.50/lb. Moreover, further reductions in activation can probably be made without substantial cost increase by selecting the ore from which the $Al_2O_3$ feedstock is derived and by process modification.

Moderators 22, comprising graphite, Be, BeO, and metal hydrides (such as $TiH_2$, $ZrH_2$ etc.), are capable of high teemperature operation and low activation. However, Be and BeO are good neutron multipliers and can boost the tritium breeding ratio. Thus, these moderators are chosen in this embodiment of FIG. 1 over the metal hydrides since the latter are strongly activated by neutrons (e.g., $TiH_2$, $ZrH_2$, etc.), and, although $MgH_2$ will not be activated strongly, it can only operate to about 400°C, since above the temperature, the $H_2$ dissociation pressure is too high.

The shell 32 is designed to contain the Be, Beo and/or graphite moderator 22 in a multilayer bank of gas cooling tubes 18 with the moderator and Li target inside the gas cooling tubes 18 so that the system is highly reliable and redundant. Also, the coolant exit temperature can be above 400°C since most of the neutron energy appears in the moderator 22 and the target 12 rather than in the shell 32, even with thermal cycle efficiencies of greater than 30%, breeding ratios in the range of 0.9 to 1.5, and structural stresses of ~ 2000 psi, which is ~ 20% of the failure stress.

A LiAl target 12, has a much higher tritium pressure than pure lithium, so that the tritium escapes into the gas coolant streams 26, which are maintained at a + pressure and circulated along the solid target 12 by small input and output bleed streams 34 and 36 so as to maintain a tritium pressure differential gradient that decreases from the inside to the outside of the solid target 12 and causes the tritium to diffuse into the gas coolant streams 26 for separation and removal of the tritium from the solid target 12 and recovery in a suitable manner, such as provided by the recovery system 29 shown in FIG. 2. Depending on the processing rates, temperatures, LiAl inventory, and the amount of protium scavenging by adding $H_2$ to the gas coolant streams 26, the tritium blanket inventory ranges from ~$10^5$ to about $10^6$ curies, while the short-lived activities, principally $Na^{24}$ (15 hour half life), decays to a negligible amount in a few days, leaving a low long lived inventory of $Al^{26}$ (7.3 × $10^5$ year half life), so that no problems of permanent waste disposal are presented, and since there is a low inventory of long lived activities, blanket module repair and replacement is relatively simple.

Heated gas coolant streams 26 can be achieved by using a single inlet coolant stream 34 to first cool the SAP shell 32 and then to cool the moderator 22 and the lithium aluminum target 12, which can be above 400°C. The temperature of the coolant output stream 36 is limited either by the maximum allowable temperature for the moderator and/or the target 12, or by the ΔT across the shell 32. Roughly one third of the energy of the neutrons 14 appears in the SAP shell 32. With a ΔT of 150°C across the SAP shell 32 (250°to 400°C), the coolant exit temperature from the module 28 is ~ 700°C. In a multiple stream modification employing two coolant streams, one is at low temperature, e.g., ~ 350°C, to cool the SAP shell 32, and one is at high temperature, e.g., ~ 1000°C to cool the moderator 22 and the target 12, and while this modification adds to the complexity, the higher thermal efficiency may offset this.

Both the single and the multiple stream modification thereof require thermal insulation 33, e.g., alumina, between the cool SAP shell 32 and the hotter interior of the module 28 where the moderator 22 and the target 12 are located. The magnitude of the heat leak depends on the thermal conductivity and thickness of the insulation 33. Since evacuated insulation adds to the complexity of the system a cooled low density, $Al_2O_3$, refractory ceramic insulator 33 about 2 cm thick and having pores filled by helium so that the insulator has a thermal conductivity of between about 0.5 to 1.0 × $10^{-2}$ w/cm° K preferred in the embodiment of FIG. 1. The allowable heat leak and the thermal conductivity fix the separation between the hotter and cooler module regions H and C, which in turn sets the module diameter (typically 0.3 to 1.0 meter). The cylindrical shell 32 has a closed bottom 42 with a dish 44 or head, which is the first wall. The helium inlet gas coolant stream 34 enters at the top 46, passes down the annular space 48 between the SAP shell 32 and the thermal insulator 33, returns through the interior of the module 28, and exits in outlet stream 36 at the upper end of top 46. Water cooling means 49 cools the insulator 33, and water coil or an annular cooling channel may be used therefor.

One form of target 12 that has a melting point of ~ 700°C and that is easy to fabricate as a solid so that it is not necessary to replace the solid even if the reactor operates for thirty years, advantageously comprises ALCOA-1199 Al in a composite containing 10/1 parts Al to Li. A majority of the Li is $Li^7$ for tritium generation from the fast neutrons 14 that are incident on the target 12 and a minority of the Li is $Li^6$ for tritium generation from the moderated or multiplied neutrons, comprising the moderated incident neutrons 14 and the neutrons 14' that are emitted from the neutron multipliers in the module 28, e.g., the described Be and BeO moderator.

In the embodiment shown, the target 12 is in the form of balls 52 made from tangled irregular clusters of randomly arranged LiAl particles P from 100A to 600 A in diameter that are vapor deposited, loosely packed by hand, and compressed under pressure in a press with a powdered moderator as a binder to form self-sustaining solid spherical balls 52 having spaces between the particles. One process for vapor depositing and compressing the Al particles is described in U.S. Pat. No. 3,824,457. Alternately, like powder metallurgy means may be used to form longitudinally extending target rods. The spaces between the particles facilitate the diffusion and release of the escaping tritium from the target 12 into the coolant gas streams in the cooling tubes 18. These powder metallurgy processes are advantageous, particularly since They produce chemically bonded elements in the particles from which the balls are made. In order to decrease the tritium inventory, scavenging protium ($H_2$) is used in the coolant gas streams, which are maintained at a pressure of about 20 Atmospheres.

FIG. 2 shows apparatus coolant gas streams for use in a controlled DT fussion reactor (CTR), such as the ATC tokamak at Princeton University, which has actually produced DD fusion neutrons and which is described in U.S. Pat. No. 3,702,163, or its successors. Circulation of a minor portion (<5%) of the gas streams 26 through a trap 54 containing metal powder absorbs the entrained circulating tritium as a solid metal hydride with the T. Suitable metals, comprise Zr, Ti and Y. The tritium is recovered from the trap by cryopumping the metal titride when the first process stream 56, which is connected to the output stream 36, is valved off so that the collected tritium can be collected and returned to the above mentioned reactor. Typically, the first process stream flow rate is on the order of 1% of the total blanket module circulation.

Additionally, a portion of the gas outlet stream 36 is converted to $T_2O$ in a second process stream 58, which also communicates with the outlet stream through the controlled addition of oxygen. The $T_2O$ is absorbed and recovered using water absorption methods, and a standard recuperator 62 known in the art.

Alternately, the entrained circulating tritium is absorbed from the outlet stream 36 into an alkali metal stream (e.g., Na). This third stream can either contact a small fraction of the outlet coolant stream 36 as in the two above-described first and second process streams, or can form an intermediate heat exchange circuit 64 between the module 28 and the steam generator 66. Tritium can then be recovered from the alkali metal by cold trapping and/or other suitable means.

In operation, a 2 cm thick SAP shell, and a solid target 12 comprising 1 mm diameter LiAl balls compacted with a Be binder is selected to have the three properties of high tritium equilibrium pressure, high melting point, and good neutron economy, i.e., predominant neutron reactions are in the lithium part of the target 12 with incident 2.45 MeV, 14.1 MeV and 14.7 MeV neutrons. The high tritium equilibrium pressure, which is important in minimizing tritium hold up in the blanket module 28, is achieved by chemically bonding the other elements to the lithium in the target 12. This reduces potential hazards and fuel cycling doubling times. It is achieved by the cited process of vapor depositing the lithium and aluminum. To this end, in one example, a standard water cooled carborundum saw divides aluminum and lithium ingots into small cubes about 2–3 millimeters on a side. Etching in 70 parts $H_3PO_4$, 12 parts $CH_3COOH$, 3 parts $HNO_3$, and 15 parts $H_2O$ removes any surface contamination from the aluminum (99.9% pure). The cubes are then placed in a helical tungsten filament inside a vacuum chamber that is evacuated to $1-5 \times 10^{-6}$ mm Hg. The system is then filled to a pressure between 1–5 mm of Hg with helium or other protective atmosphere. The aluminum and lithium division and chemical bonding proceeds further by evaporating the etched cubes from the helical tungsten filament. The two elements are thus chemically combined and deposited on the inside of the glass shpere shown in FIG. 1 of the cited U.S. Pat. No. 3,824,457 patent to form the desired irregular, randomly arranged particles averaging 100–600 A in diameter. The particles are then collected into tangled, irregular, randomly arranged clusters by remote hand brushing or scraping into a collecting container whereupon the LiAl particles are mixed with Be particles of the same size and transferred to a mold having a press where shaping and linking of the particles into porous targets 12 is achieved by compression at about 1000 psi into the desired, shaped, solid mass containing a plurality of solid, chemically bonded, pure target particles of the desired shape having pores or spaces therebetween. By changing the gas pressure to vary the same during the vapor deposition, the particles sizes could be controlled.

The use of solid, LiAl, 1 mm diameter targets 12 having a Be powder binder (and/or alternately ~ micron diameter $LiAlO_2$ balls, which are made by the described process, except that air is added during the vapor deposition, and/or which are placed in the hotter center region of the blanket module, or $LiSi_3$ balls) for tritium breeding, eliminates the corrosion problems associated with liquid lithium and flibe known heretofore. At low temperatures of about 400°F, and low helium coolant gas stream velocities of about 2 ft/sec., corrosion problems are avoided. At higher temperatures, the SAP shell is water cooled, in which case corrosion in the water and the helium coolants is still no problem.

The described module has low long-lived residual radioactivity using fusion neutrons, about six to seven orders of magnitude lower than the inventory if one uses niobium or stainless steel. Short lived activation due to $Na^{24}$ (produced by $(n,\alpha)$ reactions on $Al^{27}$) is on the order of $10^9$ curies. This isotope has a very short half life, and most of the residual radioactivity results from neutron activation of small amounts of impurities in the main blanket module materials, i.e., aluminum-26, aluminum-27, graphite, beryllium, and aluminum oxide, and this activation may be further reduced by advances in purification technology. Assuming three year operating life-times, discarded scap, comprising lithium and beryllium, has very low residual radiation, ~ 1 curie/metric ton, with no after heat problem. It is simply compressed and stored in vaults on the site of the module use.

The blanket module inventory of tritium can be held to relatively low levels with solid lithium aluminum compounds having an average holdup time of tritium of 0.5 hours. Tritium extraction from the solid compound is controlled by diffusion, and much shorter hold up times can be achieved by reducing the target particle size than 1 mm for LiAl and $30\mu$ for $LiAlO_2$. The tritium is released seriatim into the helium coolant gas streams, a separate process stream, and a tritium trap comprising a bed of titanium metal particles. This process stream, which is < 5 percent of the main helium coolant gas streams, flows through the tritium trap, which is at 500°C, the same temperature as the process stream. After tritium is absorbed for 15 minutes, the beds are switched and tritium is desorbed by cryopumping.

The shell in this example is SAP. However, Al — Mg — Si wrought alloy (6000 series type) can alternately be substituted therefor, since the latter is more ductile and easier to fabricate than the SAP alloy described above. On the other hand, its maximum temperature capability is 400°–500°F vs. 750°F for SAP. While gas cooling is all that is required for either shell material, water cooling may be added to increase the module efficiency. Also, water coolant for the aluminum module shell, while not mandatory, provides good temperature control and high heat transfer capability if desired.

This invention has the advantage of providing a low neutron activation method and apparatus for producing tritium gas in a reliable and long operating life-time system employing a solid lithium neutron target that overcomes the problems with the heretofore known liquid metals and salts of material compatitility and corrosion.

Table 1

| Impurity | ALCOA 1199 (Standard) | ALCOA 1199 (Selected) |
|---|---|---|
| Si | 30 | 20 |
| Fe* | 10 | 7 |
| Mn* | 10 | 9 |
| Mg,Pb*,Cu | 1 | 1 |
| Cr* | 3 | 0 |
| Zn* | 14 | 10 |
| Ti | 2 | 2 |
| V* | 3 | 2 |
| Sn*,Bi* | 2 | 1 |
| B | 4 | 2 |
| Ga | 10 | 8 |
| Zr* | 3 | 4 |
| Cd*,Sb*,Be,Ni* | 0 | 0 |
| Co*,Mo* | <2 | 0 |
| Na,Ca* | ≦1 | <1 |

Impurity Concentrations in ALCOA 1199 Aluminum Concentration, ppm (weight)

*Impurities with long lived activation, either by thermal or fast neutrons.

What is claimed is:

1. Tritium gas producing apparatus for use with a source of neutrons comprising means consisting of:
   a. solid lithium target means for receiving the neutrons so as to produce tritium that diffuses through the solid lithium means; and
   b. sintered aluminum product cooling means interposed between the solid lithium target means and the source of neutrons for containing gas coolant that circulates under pressure through the cooling means in contact with the solid lithium target means to separate and remove the tritium that escapes from the solid lithium means by said diffusion.

2. The invention of claim 1 in which the solid lithium target means has contained therein other elements that are chemically bonded thereto so as to have a high tritium equilibrium pressure, a high melting point above about 500° C, and good neutron economy by providing small thermal and fast neutron cross-sections so that the predominant neutron reactions therein are in the lithium part thereof.

3. The invention of claim 1 in which the elements in the solid lithium means beside Li are selected from the group consisting of Al, O, Mg, Si and F.

4. The invention of claim 1 in which the solid Li means is LiAl with a melting point of greater than about 500°C having good neutron economy and a high tritium equilibrium pressure of about $10^3$ times better than Li for the same tritium concentration.

5. The invention of claim 1 in which the solid means is a 1 mm diameter ball containing LiAl particles 100 to 600 A in diameter having a binder consisting of finely divided Be particles of about the same diameter as the LiAl particles that are compressed therewith.

6. The invention of claim 1 having cooling tubes (18) containing the solid lithium target means (12) and a moderator (22) adjacent the solid lithium target means (12) adapted to receive and transport the gas coolant along the tube axis, the sintered aluminum product cooling means forming a shell (32) having an insulator (33) between the shell (32) and the cooling tubes (18) adapted to transport the gas coolant into and out of the cooling tubes.

7. The invention of claim 6 having a shell and cooling tubes made from sintered aluminum product containing $Al_2O_3$ dispersoid for strength and integrity.

8. The invention of claim 6 having an inlet means for the gas coolant adapted to circulate the coolant between the insulator and the cooling tubes before circulating the coolant in contact with the solid lithium target means.

9. The invention of claim 6 having solid means consisting of pellets exposed to the gas coolant in the cooling tubes.

10. The invention of claim 6 having cooling tubes and protium gas means in the tubes containing hydrogen for scavenging the tritium in the gas coolant.

11. The invention of claim 6 having a trap for removing the tritium from inside the cooling tubes, the trap containing metal means for absorbing the tritium as a solid metal tritide, selected from the group consisting of the tritides containing Zr, Ti and Y.

12. The invention of claim 11 having means for converting the absorbed solid metal tritide into $T_2O$ by the addition of oxygen thereto for absorption and recovery by water absorption.

13. The invention of claim 6 having means adapted to contain liquid alkali metal for absorbing the tritium from the gas coolant for recovery from the alkali metal by cold trapping.

14. The invention of claim 13 having means adapted to contain the liquid alkali metal means in contact with a minor amount of the gas coolant.

15. The invention of claim 13 in which the liquid alkali metal means includes means for forming an intermediate heat exchange circuit having heat exchange means and a steam generator for supplying useful heat from the gas coolant in direct proportion to the neutron energy that is received and moderated in said moderator to produce heat by the slowing down of the neutrons.

* * * * *